US012591132B2

(12) United States Patent
Alsaqqa et al.

(10) Patent No.: US 12,591,132 B2
(45) Date of Patent: Mar. 31, 2026

(54) METHODS AND APPARATUSES FOR SPATIALLY FILTERING OPTICAL PULSES

(71) Applicants: ASML NETHERLANDS B.V., Veldhoven (NL); ASML HOLDING N.V., Veldhoven (NL)

(72) Inventors: Ali Alsaqqa, Trumbull, CT (US); Patrick Sebastian Uebel, Marloffstein (DE); Paulus Antonius Andreas Teunissen, Eindhoven (NL)

(73) Assignees: ASML NETHERLANDS B.V., Veldhoven (NL); ASML HOLDING N.V., Veldhoven (NL)

( * ) Notice: Subject to any disclaimer, the term of this patent is extended or adjusted under 35 U.S.C. 154(b) by 253 days.

(21) Appl. No.: 18/273,478

(22) PCT Filed: Jan. 12, 2022

(86) PCT No.: PCT/EP2022/050489
§ 371 (c)(1),
(2) Date: Jul. 20, 2023

(87) PCT Pub. No.: WO2022/167179
PCT Pub. Date: Aug. 11, 2022

(65) Prior Publication Data
US 2024/0134182 A1 Apr. 25, 2024

Related U.S. Application Data

(60) Provisional application No. 63/145,736, filed on Feb. 4, 2021.

(30) Foreign Application Priority Data

Mar. 29, 2021 (EP) ..................................... 21165646

(51) Int. Cl.
*G02B 26/08* (2006.01)
*G02B 27/09* (2006.01)

(52) U.S. Cl.
CPC ..... *G02B 26/0816* (2013.01); *G02B 27/0977* (2013.01)

(58) Field of Classification Search
CPC ........................ G02B 26/0816; G02B 27/0977
(Continued)

(56) References Cited

U.S. PATENT DOCUMENTS 3,307,448 A 3/1967 Stimler et al.
5,852,621 A 12/1998 Sandstrom
(Continued)

FOREIGN PATENT DOCUMENTS

CN 111263918 6/2020
EP 1628164 2/2006
(Continued)

OTHER PUBLICATIONS

International Search Report and Written Opinion issued in corresponding PCT Patent Application No. PCT/EP2022/050489, dated Jan. 12, 2022.
(Continued)

*Primary Examiner* — William Choi
(74) *Attorney, Agent, or Firm* — Pillsbury Winthrop Shaw Pittman, LLP

(57) ABSTRACT

An optical filter apparatus including an optical divergence device, operable to receive optical pulses and spatially distribute the optical pulses over an optical plane in dependence with a pulse energy of each of the optical pulses; and a spatial filter, located at the optical plane, operable to apply spatial filtering to the optical pulses based on a location of each of the optical pulses at the optical plane resulting from the spatial distributing.

20 Claims, 8 Drawing Sheets

(58) Field of Classification Search
USPC ......................................................... 359/298
See application file for complete search history.

(56) References Cited

U.S. PATENT DOCUMENTS

| | | | |
|---|---|---|---|
| 6,952,253 | B2 | 10/2005 | Lof et al. |
| 6,961,116 | B2 | 11/2005 | Den Boef et al. |
| 7,265,364 | B2 | 9/2007 | Teunissen et al. |
| 7,646,471 | B2 | 1/2010 | Teunissen et al. |
| 9,160,137 | B1 | 10/2015 | Abdolvand et al. |
| 10,648,919 | B2 | 5/2020 | Witte et al. |
| 2004/0015085 | A1 | 1/2004 | Soh et al. |
| 2004/0135517 | A1 | 7/2004 | Schriever et al. |
| 2007/0296960 | A1 | 12/2007 | Den Boef et al. |
| 2008/0143989 | A1 | 6/2008 | Brudermann et al. |
| 2008/0198380 | A1 | 8/2008 | Straaijer et al. |
| 2009/0168062 | A1 | 7/2009 | Straaijer et al. |
| 2010/0007863 | A1 | 1/2010 | Jordanoska |
| 2010/0233600 | A1 | 9/2010 | Den Boef et al. |
| 2010/0328655 | A1 | 12/2010 | Den Boef |
| 2011/0026032 | A1 | 2/2011 | Den Boef et al. |
| 2011/0032500 | A1 | 2/2011 | Straaijer |
| 2011/0102753 | A1 | 5/2011 | Van De Kerkhof et al. |
| 2011/0102793 | A1 | 5/2011 | Straaijer |
| 2011/0188020 | A1 | 8/2011 | Den Boef |
| 2011/0249244 | A1 | 10/2011 | Leewis et al. |
| 2012/0044470 | A1 | 2/2012 | Smilde et al. |
| 2012/0044495 | A1 | 2/2012 | Straaijer |
| 2013/0162996 | A1 | 6/2013 | Straaijer et al. |
| 2013/0308142 | A1 | 11/2013 | Straaijer |
| 2015/0261097 | A1 | 9/2015 | Mathijssen et al. |
| 2016/0161863 | A1 | 6/2016 | Den Boef et al. |
| 2016/0370717 | A1 | 12/2016 | Den Boef et al. |

FOREIGN PATENT DOCUMENTS

| | | |
|---|---|---|
| EP | 3410211 | 12/2018 |
| JP | H08509063 | 9/1996 |
| JP | 2020527736 | 9/2020 |
| SU | 596047 | 3/1981 |
| SU | 942500 A2 * | 5/1984 |
| TW | 201532481 | 8/2015 |
| WO | 95002170 | 1/1995 |
| WO | 2011/012624 | 2/2011 |
| WO | 2016/102127 | 6/2016 |
| WO | 2017/032454 | 3/2017 |
| WO | 2018/127266 | 7/2018 |

OTHER PUBLICATIONS

Dakang Ma et al., "Measurement of wavelength-dependent radiation pressure from photon reflection and absorption due to thin film interference", Scientific Reports, vol. 8, No. 1, pp. 1-6 (Dec. 1, 2018).

H.-J. Butt et al., "Force measurements with the atomic force microscope: Technique, interpretation and applications", Surface Science Reports 59 pp. 1-152 (2005).

Meirovitch, "Fundamentals of Vibrations", McGraw-Hill, (2001).

Office Action issued in corresponding Japanese Patent Application No. 2023-547216 dated Nov. 4, 2025.

* cited by examiner

LA

SC1

SC3

CL

-1   0   +1

SC2

MT

2

4

SM1

PU

Z

X

W

6

λ

Z

8

X

METHODS AND APPARATUSES FOR SPATIALLY FILTERING OPTICAL PULSES

CROSS REFERENCE TO RELATED APPLICATIONS

This application is the U.S. national phase entry of PCT Patent Application No. PCT/EP2022/050489 which was filed Jan. 12, 2022, which claims priority of U.S. Patent Application No. 63/145,736 which was filed on Feb. 4, 2021 and of European Patent Application No. 21165646.7 which was filed on Mar. 29, 2021, and which are incorporated herein in their entireties by reference.

FIELD

The present invention relates to methods and apparatuses for spatially filtering optical pulses, and in particular such methods and apparatuses in relation to noise reduction applications for pulsed radiation sources.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

Metrology tools are used in many aspects of the IC manufacturing process, for example as alignment tools for proper positioning of a substrate prior to an exposure, leveling tools to measure a surface topology of the substrate, for e.g., focus control and scatterometry based tools for inspecting/measuring the exposed and/or etched product in process control. In each case, a radiation source is required. For various reasons, including measurement robustness and accuracy, broadband or white light radiation sources are increasingly used for such metrology applications. It would be desirable to improve on present devices for broadband radiation generation.

SUMMARY

In a first aspect of the invention there is provided an optical filter apparatus, comprising an optical divergence device, operable to receive optical pulses and spatially distribute the optical pulses over an optical plane in dependence with a pulse energy of each of the optical pulses; and a spatial filter, located at said optical plane, operable to apply spatial filtering to the optical pulses based on a location of each of the optical pulses at the optical plane resulting from the spatial distributing.

Preferably, the optical divergence device comprises a deflectable mirror configured to receive and subsequently reflect the optical pulses; said deflectable mirror being further configured to deflect upon every reflection of each of the optical pulses, the magnitude of said deflection being dependent on a pulse energy of each of the optical pulses and said deflection resulting in spatially distributing the optical pulses over the optical plane.

More preferably, the optical divergence device further comprises an optical delay arrangement configured to apply a delay time to the optical pulses subsequent to them having undergone a first reflection from the deflectable mirror and direct them back to the deflectable mirror to undergo a second reflection by the deflectable mirror.

In a second aspect of the invention there is provided a method of spatial filtering optical pulses, comprising: spatially distributing a plurality of optical pulses over an optical plane in dependence with a pulse energy of each of the optical pulses; and spatial filtering the optical pulses based on a location of each of the optical pulses at the optical plane resulting from the spatial distributing.

Preferably, the spatial distributing of the optical pulses further comprises: using a deflectable mirror to first reflect optical pulses; applying a delay time to the optical pulses first reflected from the deflectable mirror and subsequently directing them back to the deflectable mirror; using the deflectable mirror to second reflect the delayed optical pulses to spatially distribute the optical pulses; wherein the deflectable mirror is deflected upon every reflection of each of the optical pulses, the deflection of the deflectable mirror being dependent on a pulse energy of each of the optical pulses.

In a third aspect of the invention there is provided a broadband light source device, being configured for generating broadband output radiation comprising said optical pulses upon receiving pump radiation, comprising an optical filter apparatus of the first aspect.

Other aspects of the invention metrology device comprising the broadband light source device of the third aspect.

BRIEF DESCRIPTION OF THE DRAWINGS

Embodiments of the invention will now be described, by way of example only, with reference to the accompanying schematic drawings, in which:

FIGS. 11(*a*) and 11(*b*) are two example plots showing the simulated pulse amplitudes before and after the application of an optical filter arrangement, respectively;

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
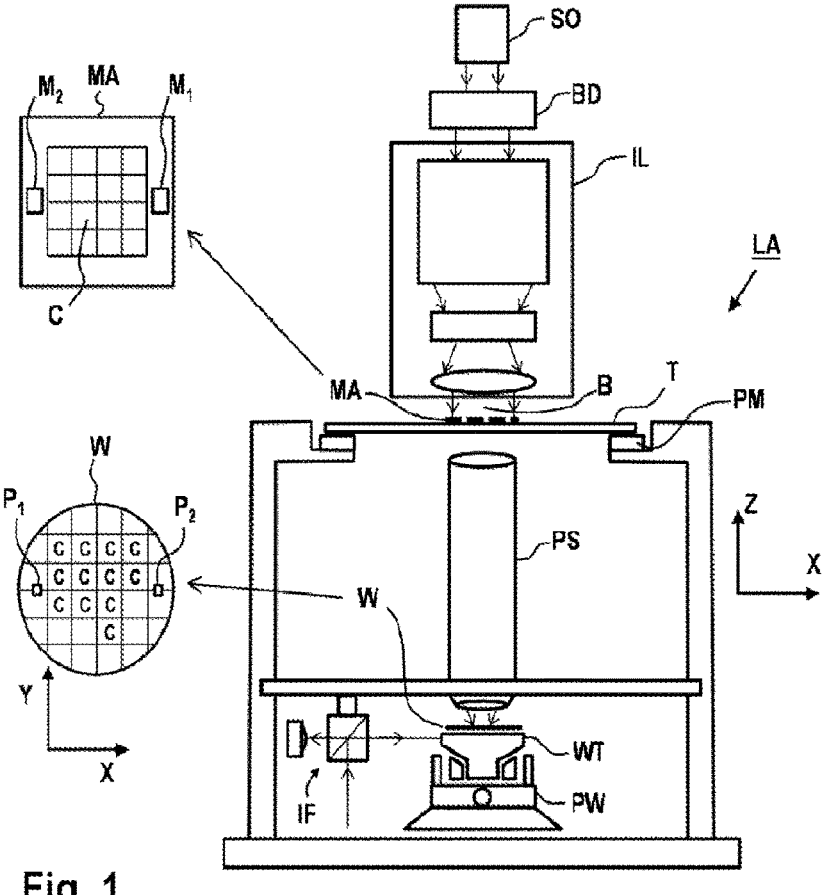
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout)

present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
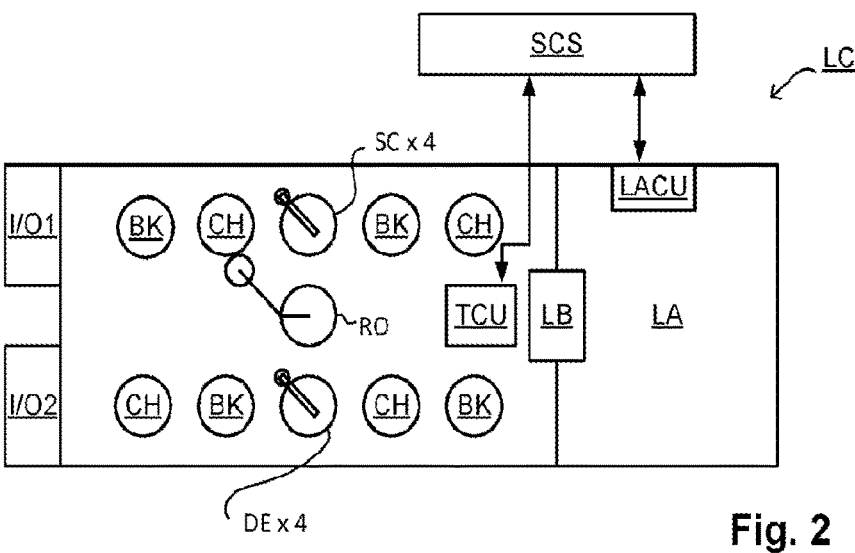
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre-and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, 1/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
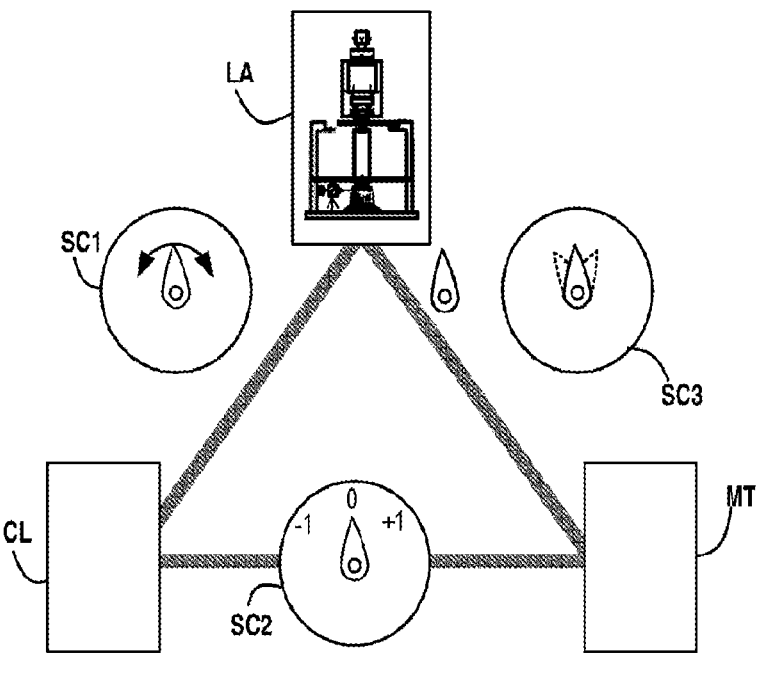
FIG. 3 depicts a schematic representation of holistic lithography, representing a cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure gratings using light from soft x-ray and visible to near-IR wavelength range.

In a first embodiment, the scatterometer MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is an ellipsometric scatterometer. The ellipsometric scatterometer allows for determining parameters of a lithographic process by measuring scattered radiation for each polarization states. Such metrology apparatus emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. No. 11/451,599, Ser. No. 11/708,678, Ser. No. 12/256,780, Ser. No. 12/486, 449, Ser. No. 12/920,968, Ser. No. 12/922,587, Ser. No. 13/000,229, Ser. No. 13/033,135, Ser. No. 13/533,110 and Ser. No. 13/891,410 incorporated herein by reference in their entirety.

In one embodiment of the scatterometer MT, the scatterometer MT is adapted to measure the overlay of two misaligned gratings or periodic structures by measuring asymmetry in the reflected spectrum and/or the detection configuration, the asymmetry being related to the extent of the overlay. The two (typically overlapping) grating structures may be applied in two different layers (not necessarily consecutive layers), and may be formed substantially at the same position on the wafer. The scatterometer may have a symmetrical detection configuration as described e.g. in co-owned patent application EP1,628,164A, such that any asymmetry is clearly distinguishable. This provides a straightforward way to measure misalignment in gratings. Further examples for measuring overlay error between the two layers containing periodic structures as target is measured through asymmetry of the periodic structures may be found in PCT patent application publication no. WO 2011/ 012624 or US patent application US 20160161863, incorporated herein by reference in its entirety.

Other parameters of interest may be focus and dose. Focus and dose may be determined simultaneously by scatterometry (or alternatively by scanning electron microscopy) as described in US patent application US2011-0249244, incorporated herein by reference in its entirety. A single structure may be used which has a unique combination of critical dimension and sidewall angle measurements for each point in a focus energy matrix (FEM—also referred to as Focus Exposure Matrix). If these unique combinations of critical dimension and sidewall angle are available, the focus and dose values may be uniquely determined from these measurements.

A metrology target may be an ensemble of composite gratings, formed by a lithographic process, mostly in resist, but also after etch process for example. Typically the pitch and line-width of the structures in the gratings strongly depend on the measurement optics (in particular the NA of the optics) to be able to capture diffraction orders coming from the metrology targets. As indicated earlier, the diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation which are configured to mimic dimensions of the functional part of the design layout in a target. Due to this sub-segmentation, the targets will behave more similar to the functional part of the design layout such that the overall process parameter measurements resembles the functional part of the design layout better. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

Figure 4:
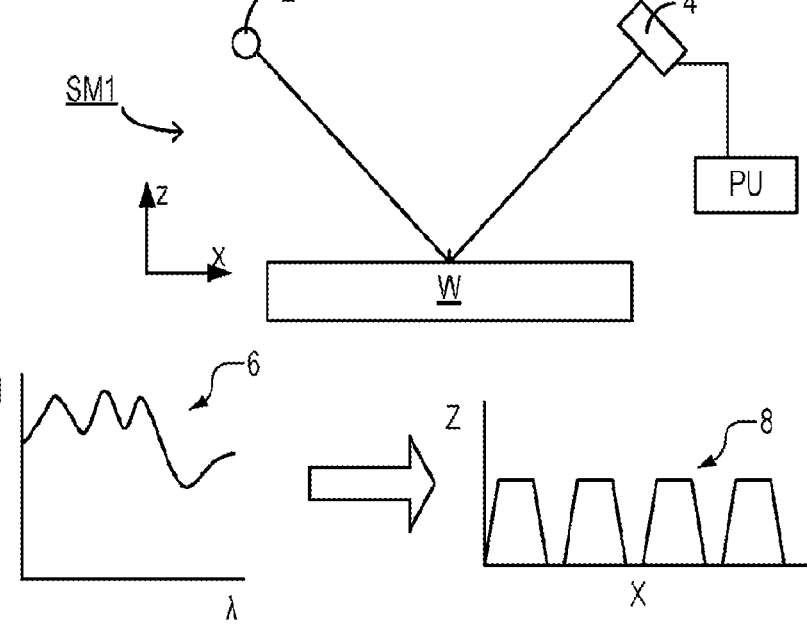
FIG. 4 depicts a schematic overview of a scatterometry apparatus used as a metrology device, which may comprise a radiation source according to embodiments of the invention.

A metrology apparatus, such as a scatterometer, is depicted in FIG. 4. It comprises a broadband (white light) radiation projector 2 which projects radiation onto a substrate 6. The reflected or scattered radiation is passed to a spectrometer detector 4, which measures a spectrum 10 (i.e. a measurement of intensity as a function of wavelength) of the specular reflected radiation. From this data, the structure or profile giving rise to the detected spectrum may be reconstructed by processing unit PU, e.g. by Rigorous Coupled Wave Analysis and non-linear regression or by comparison with a library of simulated spectra as shown at the bottom of FIG. 3. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

Overall measurement quality of a lithographic parameter via measurement of a metrology target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016/0161863 and published US patent application US 2016/0370717A1 incorporated herein by reference in its entirety.

Another type of metrology tool used in IC manufacture is a topography measurement system, level sensor or height sensor. Such a tool may be integrated in the lithographic apparatus, for measuring a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
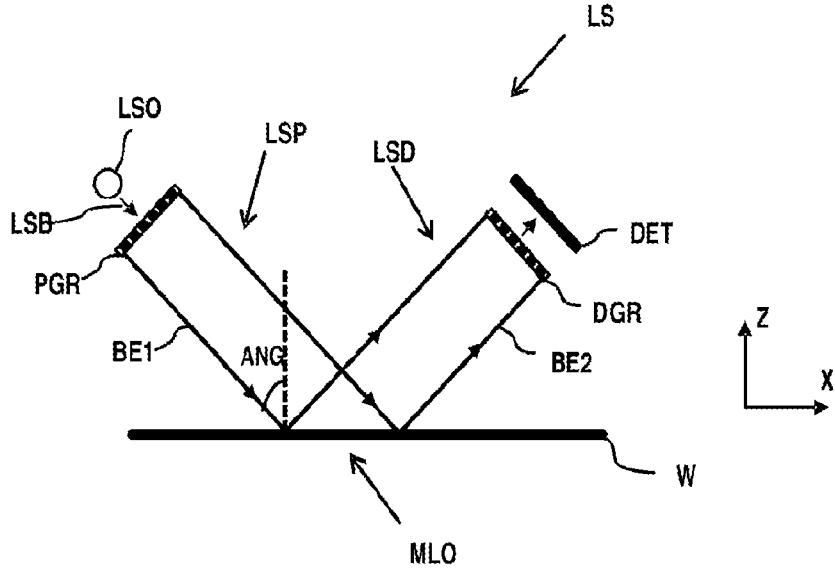
FIG. 5 depicts a schematic overview of a level sensor apparatus which may comprise a radiation source according to embodiments of the invention.

An example of a level or height sensor LS as known in the art is schematically shown in FIG. 5, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband light source, such as a supercontinuum light source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the light received, for example indicative of the intensity of the light received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, both incorporated by reference. A height sensor using UV radiation instead of visible or infrared radiation is disclosed in US2010233600A1, incorporated by reference. In WO2016102127A1, incorporated by reference, a compact height sensor is described which uses a multi-element detector to detect and recognize the position of a grating image, without needing a detection grating.

Another type of metrology tool used in IC manufacture is an alignment sensor. A critical aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks or targets. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor used in current lithographic apparatus is based on a self-referencing interferometer as described in U.S. Pat. No. 6,961,116. Various enhancements and modifications of the position sensor have been developed, for example as disclosed in US2015261097A1. The contents of all of these publications are incorporated herein by reference.

Figure 6:
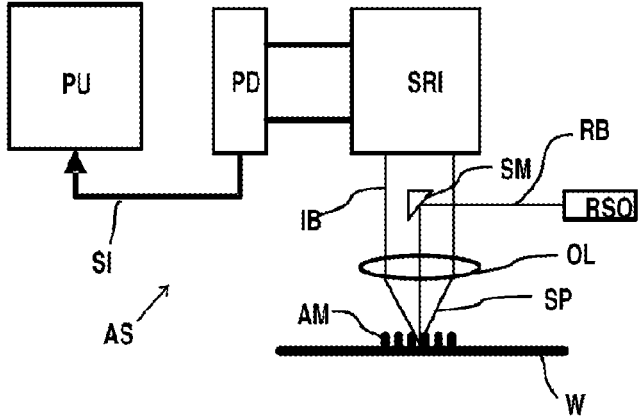
FIG. 6 depicts a schematic overview of an alignment sensor apparatus which may comprise a radiation source according to embodiments of the invention.

FIG. 6 is a schematic block diagram of an embodiment of a known alignment sensor AS, such as is described, for example, in U.S. Pat. No. 6,961,116, and which is incorporated by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in diameter than the width of the mark itself.

Radiation diffracted by the alignment mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

Metrology tools MT, such as a scatterometer, topography measurement system, or position measurement system mentioned above may use radiation originating from a radiation source to perform a measurement. The properties of the radiation used by a metrology tool may affect the type and quality of measurements that may be performed. For some applications, it may be advantageous to use multiple radiation frequencies to measure a substrate, for example broadband radiation may be used. Multiple different frequencies may be able to propagate, irradiate, and scatter off a metrology target with no or minimal interference with other frequencies. Therefore different frequencies may for example be used to obtain more metrology data simultaneously. Different radiation frequencies may also be able to interrogate and discover different properties of a metrology target. Broadband radiation may be useful in metrology systems MT such as for example level sensors, alignment mark measurement systems, scatterometry tools, or inspection tools. A broadband radiation source may be a supercontinuum source.

High quality broadband radiation, for example supercontinuum radiation, may be difficult to generate. One method for generating broadband radiation may be to broaden high-power narrow band or single frequency input radiation or pump radiation, for example making use of non-linear, higher order effects. The input radiation (which may be produced using a laser) may be referred to as pump radiation. Alternatively, the input radiation may be referred to as seed radiation. To obtain high power radiation for broadening effects, radiation may be confined into a small area so that strongly localised high intensity radiation is achieved. In those areas, the radiation may interact with broadening structures and/or materials forming a non-linear medium so as to create broadband output radiation. In the high intensity radiation areas, different materials and/or structures may be used to enable and/or improve radiation broadening by providing a suitable non-linear medium.

In some implementations, the broadband output radiation is created in a photonic crystal fiber (PCF). In several embodiments, such a photonic crystal fiber has microstructures around its fiber core assisting in confining radiation that travels through the fiber in the fiber core. The fiber core can be made of a solid material that has non-linear properties and that is capable of generating broadband radiation when high intensity pump radiation is transmitted through the fiber core. Although it is feasible to generate broadband radiation in solid core photonic crystal fibers, there may be a few disadvantages of using a solid material. For example, if UV radiation is generated in the solid core, this radiation might not be present in the output spectrum of the fiber because the radiation is absorbed by most solid material.

In some implementations, as discussed further below with reference to FIG. 8, methods and apparatus for broadening input radiation may use a fiber for confining input radiation, and for broadening the input radiation to output broadband radiation. The fiber may be a hollow core fiber, and may comprise internal structures to achieve effective guiding and confinement of radiation in the fiber. The fiber may be a hollow core photonic crystal fiber (HC-PCF), which is particularly suitable for strong radiation confinement, predominantly inside the hollow core of the fiber, achieving high radiation intensities. The hollow core of the fiber may be filled with a gas acting as a broadening medium for broadening input radiation. Such a fiber and gas arrangement may be used to create a supercontinuum radiation source. Radiation input to the fiber may be electromagnetic radiation, for example radiation in one or more of the infrared, visible, UV, and extreme UV spectra. The output radiation may consist of or comprise broadband radiation, which may be referred to herein as white light.

Some embodiments relate to a new design of such a broadband radiation source comprising an optical fiber. The optical fiber is a hollow-core, photonic crystal fiber (HC-PCF). In particular, the optical fiber may be a hollow-core, photonic crystal fiber of a type comprising anti-resonant structures for confinement of radiation. Such fibers comprising anti-resonant structures are known in the art as anti-resonant fibers, tubular fibers, single-ring fibers, negative curvature fibers or inhibited coupling fibers. Various different designs of such fibers are known in the art. Alternatively, the optical fiber may be photonic bandgap fibers (HC-PBFs, for example a Kagome fiber).

Figure 9:
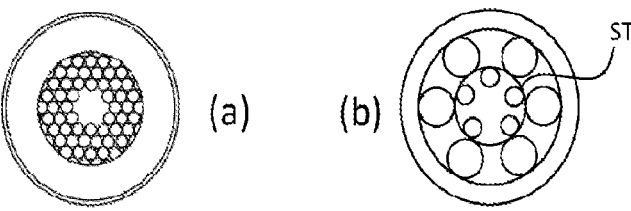
FIGS. 9(*a*) and 9(*b*) schematically depict the transverse cross-sections of examples of hollow core photonic crystal fiber (HC-PCF) designs for supercontinuum generation.

A number of types of HC-PCFs can be engineered, each based on a different physical guidance mechanism. Two such HC-PCFs include: hollow-core photonic bandgap fibers (HC-PBFs) and hollow-core anti-resonant reflecting fibers (HC-ARFs). Detail on the design and manufacture of HC-PCFs can be found in US patent US2004/015085A1 (for HC-PBFs) and International PCT patent application WO2017/032454A1 (for Hollow Core anti-resonant reflecting fibers), which are incorporated herein by reference. FIG. 9(a) shows a Kagome fiber, comprising a Kagome lattice structure.

Figure 7:
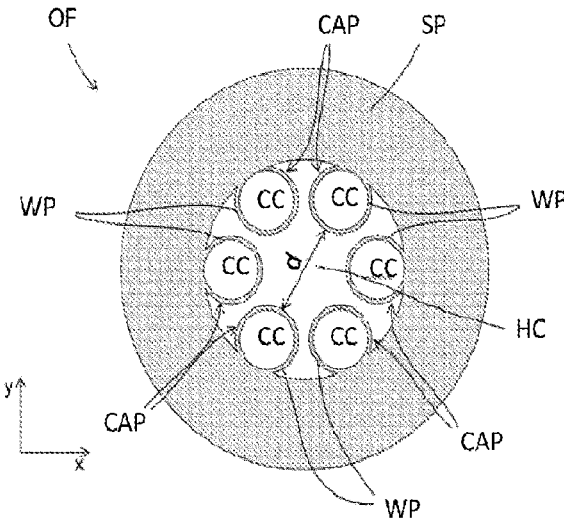
FIG. 7 is a schematic cross sectional view of a hollow core optical fiber that may form part of a radiation source according to an embodiment in a transverse plane (i.e. perpendicular to an axis of the optical fiber)

An example of an optical fiber for use in the radiation source is now described with reference to FIG. 7, which is a schematic cross sectional view of the optical fiber OF in a transverse plane. Further embodiments similar to the practical example of the fiber of FIG. 7 are disclosed in WO2017/032454A1.

The optical fiber OF comprises an elongate body, which is longer in one dimension compared to the other two dimensions of the fiber OF. This longer dimension may be referred to as an axial direction and may define an axis of the optical fiber OF. The two other dimensions define a plane which may be referred to as a transverse plane. FIG. 7 shows a cross-section of the optical fiber OF in this transverse plane (i.e. perpendicular to the axis), which is labelled as the x-y plane. The transverse cross-section of the optical fiber OF may be substantially constant along the fiber axis.

It will be appreciated that the optical fiber OF has some degree of flexibility and therefore the direction of the axis will not, in general, be uniform along the length of the optical fiber OF. The terms such as the optical axis, the transverse cross-section and the like will be understood to mean the local optical axis, the local transverse cross-section and so on. Furthermore, where components are described as being cylindrical or tubular these terms will be understood to encompass such shapes that may have been distorted as the optical fiber OF is flexed.

The optical fiber OF may have any length and it will be appreciated that the length of the optical fiber OF may be dependent on the application. The optical fiber OF may have a length between 1 cm and 10 m, for example, the optical fiber OF may have a length between 10 cm and 100 cm.

The optical fiber OF comprises: a hollow core HC; a cladding portion surrounding the hollow core HC; and a support portion SP surrounding and supporting the cladding portion. The optical fiber OF may be considered to comprise a body (comprising the cladding portion and the support portion SP) having a hollow core HC. The cladding portion comprises a plurality of anti-resonance elements for guiding radiation through the hollow core HC. In particular, the plurality of anti-resonance elements are arranged to confine radiation that propagates through the optical fiber OF predominantly inside the hollow core HC and to guide the radiation along the optical fiber OF. The hollow core HC of the optical fiber OF may be disposed substantially in a central region of the optical fiber OF, so that the axis of the optical fiber OF may also define an axis of the hollow core HC of the optical fiber OF.

The cladding portion comprises a plurality of anti-resonance elements for guiding radiation propagating through the optical fiber OF. In particular, in this embodiment, the cladding portion comprises a single ring of six tubular capillaries CAP. Each of the tubular capillaries CAP acts as an anti-resonance element.

The capillaries CAP may also be referred to as tubes. The capillaries CAP may be circular in cross section, or may have another shape. Each capillary CAP comprises a generally cylindrical wall portion WP that at least partially defines the hollow core HC of the optical fiber OF and separates the hollow core HC from a capillary cavity CC. It will be appreciated that the wall portion WP may act as an anti-reflecting Fabry-Perot resonator for radiation that propagates through the hollow core HC (and which may be incident on the wall portion WP at a grazing incidence angle). The thickness of the wall portion WP may be suitable so as to ensure that reflection back into the hollow core HC is generally enhanced whereas transmission into the capillary cavity CC is generally suppressed. In some embodiments, the capillary wall portion WP may have a thickness between 0.01-10.0 μm.

It will be appreciated that, as used herein, the term cladding portion is intended to mean a portion of the optical fiber OF for guiding radiation propagating through the optical fiber OF (i.e. the capillaries CAP which confine said radiation within the hollow core HC). The radiation may be confined in the form of transverse modes, propagating along the fiber axis.

The support portion is generally tubular and supports the six capillaries CAP of the cladding portion. The six capillaries CAP are distributed evenly around an inner surface if the inner support portion SP. The six capillaries CAP may be described as being disposed in a generally hexagonal formation.

The capillaries CAP are arranged so that each capillary is not in contact with any of the other capillaries CAP. Each of the capillaries CAP is in contact with the inner support portion SP and spaced apart from adjacent capillaries CAP in the ring structure. Such an arrangement may be beneficial since it may increase a transmission bandwidth of the optical fiber OF (relative, for example, to an arrangement wherein the capillaries are in contact with each other). Alternatively, in some embodiments, each of the capillaries CAP may be in contact with adjacent capillaries CAP in the ring structure.

The six capillaries CAP of the cladding portion are disposed in a ring structure around the hollow core HC. An inner surface of the ring structure of capillaries CAP at least partially defines the hollow core HC of the optical fiber OF. The diameter d of the hollow core HC (which may be defined as the smallest dimension between opposed capillaries, indicated by arrow d) may be between 10 and 1000 μm. The diameter d of the hollow core HC may affect the mode field diameter, impact loss, dispersion, modal plurality, and non-linearity properties of the hollow core HC optical fiber OF.

In this embodiment, the cladding portion comprises a single ring arrangement of capillaries CAP (which act as anti-resonance elements). Therefore, a line in any radial direction from a center of the hollow core HC to an exterior of the optical fiber OF passes through no more than one capillary CAP.

It will be appreciated that other embodiments may be provided with different arrangements of anti-resonance elements. These may include arrangements having multiple rings of anti-resonance elements and arrangements having nested anti-resonance elements. FIG. 9(a) shows an embodiment of HC-PCFs with three rings of capillaries CAP stacking on top of each other along the radial direction. In this embodiment, each capillary CAP is in contact with other capillaries both in the same ring and in a different ring. Furthermore, although the embodiment shown in FIG. 7 comprises a ring of six capillaries, in other embodiments, one or more rings comprising any number of anti-resonance elements (for example 4, 5, 6, 7, 8, 9, 10, 11 or 12 capillaries) may be provided in the cladding portion.

FIG. 9(b) shows a modified embodiment of the above discussed HC-PCFs with a single ring of tubular capillaries. In the example of FIG. 9(b) there are two coaxial rings of tubular capillaries 21. For holding the inner and outer rings of tubular capillaries 21, a support tube ST may be included in the HC-PCF. The support tube may be made of silica.

The tubular capillaries of the examples of FIG. 7 and FIGS. 9(a) and (b) may have a circular cross-sectional shape. Other shapes are also possible for the tubular capillaries, like elliptical or polygonal cross-sections. Additionally, the solid material of the tubular capillaries of the examples of FIG. 7 and FIGS. 9(a) and (b) may comprise plastic material, like PMA, glass, like silica, or soft glass.

Figure 8:
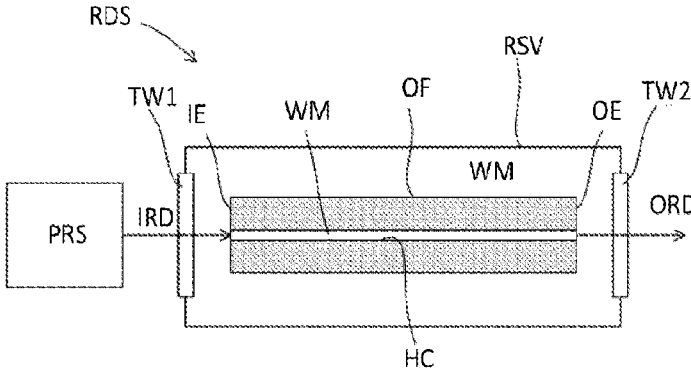
FIG. 8 depicts a schematic representation of a radiation source according to an embodiment for providing broadband output radiation.

FIG. 8 depicts a radiation source RDS for providing broadband output radiation. The radiation source RDS comprises a pulsed pump radiation source PRS or any other type of source that is capable of generating short pulses of a desired length and energy level; an optical fiber OF (for example of the type shown in FIG. 7) with a hollow core HC; and a working medium WM (for example a gas) disposed within the hollow core HC. Although in FIG. 8 the radiation source RDS comprises the optical fiber OF shown in FIG. 7, in alternative embodiments other types of hollow core HC optical fiber OF may be used.

The pulsed pump radiation source PRS is configured to provide input radiation IRD. The hollow core HC of the optical fiber OF is arranged to receive the input radiation IRD from the pulsed pump radiation source PRS, and broaden it to provide output radiation ORD. The working medium WM enables the broadening of the frequency range of the received input radiation IRD so as to provide broadband output radiation ORD.

The radiation source RDS further comprises a reservoir RSV. The optical fiber OF is disposed inside the reservoir RSV. The reservoir RSV may also be referred to as a housing, container or gas cell. The reservoir RSV is configured to contain the working medium WM. The reservoir RSV may comprise one or more features, known in the art, for controlling, regulating, and/or monitoring the composition of the working medium WM (which may be a gas) inside the reservoir RSV. The reservoir RSV may comprise a first transparent window TW1. In use, the optical fiber OF is disposed inside the reservoir RSV such that the first transparent window TW1 is located proximate to an input end IE of the optical fiber OF. The first transparent window TW1 may form part of a wall of the reservoir RSV. The first transparent window TW1 may be transparent for at least the received input radiation frequencies, so that received input radiation IRD (or at least a large portion thereof) may be coupled into the optical fiber OF located inside reservoir RSV. It will be appreciated that optics (not shown) may be provided for coupling the input radiation IRD into the optical fiber OF.

The reservoir RSV comprises a second transparent window TW2, forming part of a wall of the reservoir RSV. In use, when the optical fiber OF is disposed inside the reservoir RSV, the second transparent window TW2 is located proximate to an output end OE of the optical fiber OF. The second transparent window TW2 may be transparent for at least the frequencies of the broadband output radiation ORD of the apparatus 120.

Alternatively, in another embodiment, the two opposed ends of the optical fiber OF may be placed inside different reservoirs. The optical fiber OF may comprise a first end section configured to receive input radiation IRD, and a second end section for outputting broadband output radiation ORD. The first end section may be placed inside a first reservoir, comprising a working medium WM. The second end section may be placed inside a second reservoir, wherein the second reservoir may also comprise a working medium WM. The functioning of the reservoirs may be as described in relation to FIG. 8 above. The first reservoir may comprise a first transparent window, configured to be transparent for input radiation IRD. The second reservoir may comprise a second transparent window configured to be transparent for broadband output broadband radiation ORD. The first and second reservoirs may also comprise a sealable opening to permit the optical fiber OF to be placed partially inside and partially outside the reservoir, so that a gas can be sealed inside the reservoir. The optical fiber OF may further comprise a middle section not contained inside a reservoir. Such an arrangement using two separate gas reservoirs may be particularly convenient for embodiments wherein the optical fiber OF is relatively long (for example when the length is more than 1 m). It will be appreciated that for such arrangements which use two separate gas reservoirs, the two reservoirs (which may comprise one or more features, known in the art, for controlling, regulating, and/or monitoring the composition of a gas inside the two reservoirs) may be considered to provide an apparatus for providing the working medium WM within the hollow core HC of the optical fiber OF.

In this context a window may be transparent for a frequency if at least 50%, 75%, 85%, 90%, 95%, or 99% of incident radiation of that frequency on the window is transmitted through the window.

Both the first TW1 and the second TW2 transparent windows may form an airtight seal within the walls of the reservoir RSV so that the working medium WM (which may be a gas) may be contained within the reservoir RSV. It will be appreciated that the gas WM may be contained within the reservoir RSV at a pressure different to the ambient pressure of the reservoir RSV.

The working medium WM may comprise a noble gas such as Argon, Krypton, and Xenon, a Raman active gas such as Hydrogen, Deuterium and Nitrogen, or a gas mixture such as an Argon/Hydrogen mixture, a Xenon/Deuterium mixture, a Krypton/Nitrogen mixture, or a Nitrogen/Hydrogen mixture. Depending on the type of filling gas, the nonlinear optical processes can include modulational instability (MI), soliton self-compression, soliton fission, Kerr effect, Raman effect and dispersive wave generation (DWG), details of which are described in WO2018/127266A1 and U.S. Pat. No. 9,160, 137B1 (both of which are hereby incorporated by reference). Since the dispersion of the filling gas can be tuned by varying the working medium WM pressure in the reservoir RSR (i.e. gas cell pressure), the generated broadband pulse dynamics and the associated spectral broadening characteristics can be adjusted so as to optimize the frequency conversion In one implementation, the working medium WM may be disposed within the hollow core HC at least during receipt of input radiation IRD for producing broadband output radiation ORD. It will be appreciated that, while the optical fiber OF is not receiving input radiation IRD for producing broadband output radiation, the gas WM may be wholly or partially absent from the hollow core HC.

In order to achieve frequency broadening high intensity radiation may be desirable. An advantage of having a hollow core HC optical fiber OF is that it may achieve high intensity radiation through strong spatial confinement of radiation propagating through the optical fiber OF, achieving high localised radiation intensities. The radiation intensity inside the optical fiber OF may be high, for example due to high received input radiation intensity and/or due to strong spatial confinement of the radiation inside the optical fiber OF. An advantage of hollow core optical fibers is that they can guide radiation having a broader wavelength range that solid-core fibers and, in particular, hollow core optical fibers can guide radiation in both the ultraviolet and infrared ranges.

An advantage of using a hollow core HC optical fiber OF may be that the majority of the radiation guided inside the optical fiber OF is confined to the hollow core HC. Therefore, the majority of the interaction of the radiation inside the optical fiber OF is with the working medium WM, which is provided inside the hollow core HC of the optical fiber OF. As a result, the broadening effects of the working medium WM on the radiation may be increased.

The received input radiation IRD may be electromagnetic radiation. The input radiation IRD may be received as pulsed radiation. For example, the input radiation IRD may comprise ultrafast pulses, for example, generated by a laser.

The input radiation IRD may be coherent radiation. The input radiation IRD may be collimated radiation, an advantage of which may be to facilitate and improve the efficiency of coupling the input radiation IRD into the optical fiber OF. The input radiation IRD may comprise a single frequency, or a narrow range of frequencies. The input radiation IRD may be generated by a laser. Similarly, the output radiation ORD may be collimated and/or may be coherent.

The broadband range of the output radiation ORD may be a continuous range, comprising a continuous range of radiation frequencies. The output radiation ORD may comprise supercontinuum radiation. Continuous radiation may be beneficial for use in a number of applications, for example in metrology applications. For example, the continuous range of frequencies may be used to interrogate a large number of properties. The continuous range of frequencies may for example be used to determine and/or eliminate a frequency dependency of a measured property. Supercontinuum output radiation ORD may comprise for example electromagnetic radiation over a wavelength range of 100 nm-4000 nm. The broadband output radiation ORD frequency range may be for example 400 nm-900 nm, 500 nm-900 nm, or 200 nm-2000 nm. The supercontinuum output radiation ORD may comprise white light.

The input radiation IRD provided by the pulsed pump radiation source PRS may be pulsed. The input radiation IRD may comprise electromagnetic radiation of one or more frequencies between 200 nm and 2 µm. The input radiation IRD may for example comprise electromagnetic radiation with a wavelength of 1.03 µm. The repetition rate of the pulsed radiation IRD may be of an order of magnitude of 1 kHz to 100 MHz. The pulse energies may have an order of magnitude of 0.1 µJ to 100 µJ, for example 1-10 µJ. A pulse duration for the input radiation IRD may be between 10 fs and 10 ps, for example 300 fs. The average power of input radiation IRD may be between 100 mW to several 100 W. The average power of input radiation IRD may for example be 20-50 W.

The pulsed pump radiation source PRS may be a laser. The spatio-temporal transmission characteristics of such a laser pulse, e.g. its spectral amplitude and phase, transmitted along the optical fiber OF can be varied and tuned through adjustment of (pump) laser parameters, working component WM variations, and optical fiber OF parameters. Said spatio-temporal transmission characteristics may include one or more of: output power, output mode profile, output temporal profile, width of the output temporal profile (or output pulse width), output spectral profile, and bandwidth of the output spectral profile (or output spectral bandwidth). Said pulsed pump radiation source PRS parameters may include one or more of: pump wavelength, pump pulse energy, pump pulse width, pump pulse repetition rate. Said optical fiber OF parameters may include one or more of: optical fiber length, size and shape of the hollow core HC, size and shape of the capillaries, thickness of the walls of the capillaries surrounding the hollow core HC. Said working component WM, e.g. filling gas, parameters may include one or more of: gas type, gas pressure and gas temperature.

The broadband output radiation ORD provided by the radiation source RDS may have an average output power of at least 1 W. The average output power may be at least 5 W. The average output power may be at least 10 W. The broadband output radiation ORD may be pulsed broadband output radiation ORD. The broadband output radiation ORD may have a power spectral density in the entire wavelength band of the output radiation of at least 0.01 mW/nm. The power spectral density in the entire wavelength band of the broadband output radiation may be at least 3 mW/nm.

In many applications that require broadband output radiation ORD, such as the aforementioned metrology applications, there is a growing interest in further reducing the noise of the broadband output radiation ORD. For pulsed laser sources, such as the aforementioned hollow core (HC) optical fiber (OF) based broadband radiation sources, the main source of the laser noise is pulse-to-pulse variation of the output radiation. When such pulsed laser sources are used in for example wafer alignment applications, the laser noise has a direct impact on the alignment position reproducibility (APR), which in turn directly affects the overlay. The higher the laser noise is the higher the APR (and hence the overlay) will be. Since the relatively high pulse-to-pulse variation is fundamental to the broadband radiation generation process, there is currently no direct solution to this light-source-intrinsic problem. Consequently, the laser noise needs to be reduced downstream of the broadband radiation source in an indirect manner.

For example, in an existing method, a beam of broadband radiation is used to illuminate an alignment mark. Subsequently, the signal beam diffracted from the alignment mark is split into two sub-signals, each carrying the same laser noise. By controlling the relative phase delay between the two sub-signals such that the two sub-signals are completely out of phase (or a phase delay of π), the two sub-signals are then added together to form the final signal. Since the two sub-signals carrying the same laser noise are out of phase, the addition of such two sub-signals results in the two sub-signals being cancelled out, while the laser noise being remained Once determined, the laser noise can then be removed from the laser signal. However, such an existing method alone is not sufficient to bring the APR down or to remove the entire laser noise. This is because any imperfection in the measurement (e.g., the two sub-signals being partially out of phase) can result in residual laser noise and thus high APR.

Figures 10, 11A, 11B:
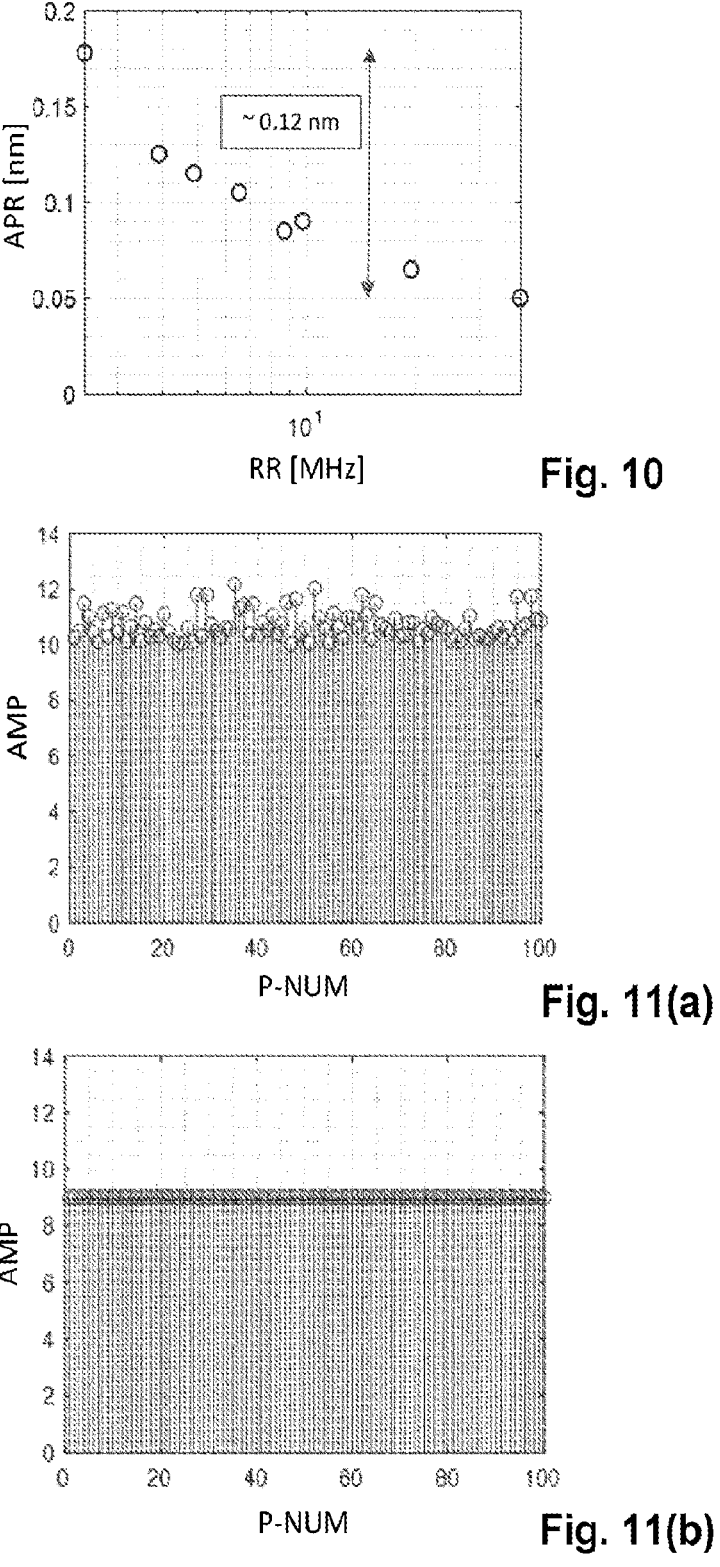
FIG. 10 is a plot showing the measured APR as a function of laser repetition rates.

FIG. 10 is an example plot showing the measured APR as a function of laser repetition rates. As shown in FIG. 10, each data point represents an APR measured with the broadband output radiation ORD at a selected repetition rate. More specifically, at each selected repetition rate, a first portion and a second portion of the broadband output radiation ORD are used to illuminate an alignment mark and generate a first alignment signal and a second alignment signal, respectively. Subsequently, the first and second alignment signals are used to generate a signal difference. The measurement is repeated a plurality of times in order to obtain a set of statistically meaningful data. The data set is then used to generate an APR data point for the selected repetition rate. By subtracting one signal from another, the dynamic vibration noise is cancelled out and hence the resultant APR is predominantly caused by the laser noise.

The figure clearly shows that the APR measured at the lowest repetition rate (i.e. 2.5 MHz) is more than 0.12 nm higher than that measured at the highest repetition rate (i.e. 40 MHz). Hence, increasing the repetition rate of the broadband radiation source would seem to be a potential solution to reduce the laser noise induced APR. However, for many broadband radiation sources, in particular hollow core HC optical fiber OF (e.g., HC-PCFs) based radiation sources, the laser lifetime is inversely proportional to the laser repetition rate, i.e. the higher the laser repetition rate the shorter the laser lifetime. For this reason, HC-PCF based radiation sources are typically operated at a relatively low repetition rate, for example, in the range between 1 MHz and 5 MHz, thereby leading to relatively high APR (e.g., 0.1 to 0.2 nm) and thus high overlay. Therefore, it is highly desirable to have a method that is able to effectively reduce the laser noise of broadband radiation sources while not compromising the laser lifetime.

Relative intensity noise (RIN) is typically used to describe the extent of pulse-to-pulse variations. RIN is the power noise normalized to the average power level and can be expressed as follows:

$$RIN = \frac{\sigma}{\mu}, \qquad [1]$$

where $\sigma$ and $\mu$ are the standard deviation and mean of the pulse amplitude distribution, respectively. The RIN of a typical HC-PCF based broadband radiation source may range from for example 0.4 to 0.6 depending on the measured wavelength or wavelength range.

In this disclosure, methods and apparatuses are proposed to overcome above-described problems associated with existing methods. The proposed methods and apparatuses which are embodied in the following examples provide a flexible and effective way of reducing the laser noise of broadband radiation sources without impacting the laser lifetime. This may be achieved by applying an optical filter arrangement to the pulses emitted from a broadband radiation source such that the pulse amplitude is stabilized and hence the extent of the pulse-to-pulse amplitude or energy variation is reduced. FIG. 11(*a*) and FIG. 11(*b*) are two example plots showing the simulated pulse amplitudes before and after the application of the optical filter arrangement, respectively. In the case of the simulated pulse amplitudes shown in FIG. 11(*a*), the pulse amplitude statistics may follow a certain distribution, e.g., Poisson distribution. The purpose of applying the optical filter arrangement to the laser pulses is then to selectively filter out the amplitude distribution such that only a desired portion (e.g., the center-most part corresponding to pulse amplitudes with higher probabilities of occurrence) of the distribution is kept. After filtering out the undesired portions, the pulse-to-pulse amplitude or energy variation can be significantly reduced, e.g., by more than 30%, as evident in FIG. 11(*b*).

Note that, the proposed methods do not necessarily require the entire spectrum of the broadband output radiation ORD to follow the same statistical distribution. The proposed methods are applicable so long as certain optical wavelengths or wavelength ranges follow a certain statistical distribution and the distribution comprises a finite width.

Figure 12:
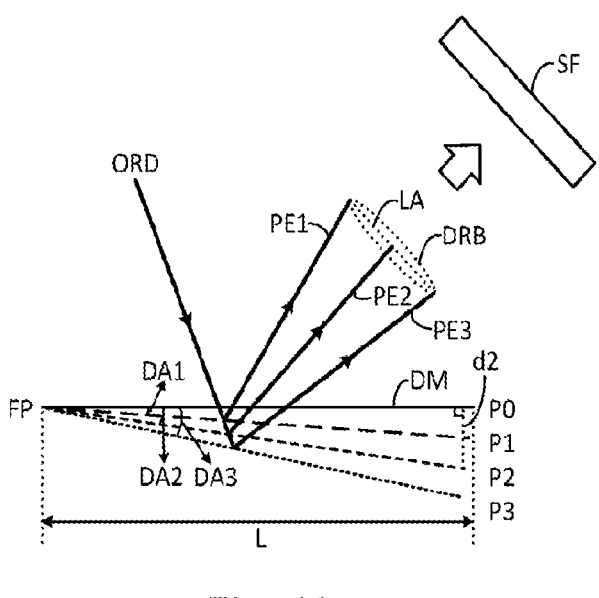
FIG. 12 schematically depicts the operating principle of the optical filter arrangement.

FIG. 12 schematically illustrates the operating principle of the optical filter arrangement. The optical filter arrangement may comprise an optical divergence device, operable to receive optical pulses and spatially distribute the optical pulses over an optical plane in dependence with a pulse energy of each of the optical pulses; and a spatial filter, located at said optical plane, operable to apply spatial filtering to the optical pulses based on a location of each of the optical pulses at the optical plane resulting from the spatial distributing. Note that, the working principle schematically illustrated in FIG. 12 is based on an embodiment of the optical filter arrangement wherein the optical divergence device comprises a deflectable mirror DM. Such a deflectable mirror DM may be used to reflect a beam of broadband output radiation ORD towards e.g., a spatial filter SF. The beam of broadband output radiation ORD may be emitted from e.g., a HC-PCF based broadband radiation source and may comprise a train of optical pulses at a certain repetition rate. One end (or fixed end) of the deflectable mirror may be fixed at a fixing point, e.g., to a mirror support, while the other end (or free end) is free to move or displace in the plane of reflection in which the beam of broadband output radiation ORD is reflected. The deflectable mirror may be configured in such a way that it is deflectable or tiltable about the fixing point FP and the deflection or tilting angle is dependent on radiation force exerted by the pulses of broadband output radiation ORD.

For example, where no pulses are incident on the deflectable mirror DM, the deflectable mirror DM may stay in a default deflection position P0. By comparison, where pulses with a certain pulse energy or amplitude are incident on the deflectable mirror DM, it may be deflected by the radiation force to a certain deflection position, such as a first, a second and a third deflection position P1, P2, P3 shown in FIG. 12. The three deflection positions P1, P2, P3 may correspond respectively to a first, a second and a third deflection angle DA1, DA2, DA3 formed with respect to the default deflection position P0, and pulses of a first, a second and a third pulse energy PE1, PE2, PE3. The third pulse energy or amplitude PE3 may be higher than the second pulse energy or amplitude PE2 which in turn may be higher than the first pulse energy or amplitude PE1. Since the deflection angle is proportional to the exerted radiation force and therefore the incident pulse energy, the third deflection angle DA3 may thus be larger than the second deflection angle DA2 which in turn may be larger than the first deflection angle DAL Each deflection angle (e.g., the second deflection angle DA2) can be approximated by the corresponding vertical displacement (e.g., d2) of the edge of the free end of the deflectable mirror divided by the length L of the deflectable mirror DM, i.e. DA2=d2/L. Note that, in the below description, the deflection of the deflectable mirror is evaluated by the resultant vertical displacement of the edge of the free end of the mirror.

Note that, for the sake of simplicity, FIG. 12 only illustrates three different scenarios, each corresponding to a pulse with a different pulse energy. In reality, the pulse train of the broadband output radiation comprises a plurality of pulses with a plurality of pulse energies. Upon reflection, although still temporally separated, some of the reflected pulses (e.g., those pulses with pulse energies or amplitudes in the center most of a Poisson distribution) will at least partially spatially overlap and thus form a spatially divergent reflected beam DRB. Assuming the broadband output radiation ORD is well collimated prior to the interaction with the deflectable mirror DM, the spatial divergence of the reflected beam DRB is thus predominantly caused by the mirror reflections at various different reflection angles and therefore the reflected beam DRB is predominantly divergent in the plane of the reflection. Consequently, the reflected beam DRB comprises an elliptical beam profile with the long axis LA being in the plane of the reflection. Other reflected pulses with pulse amplitudes or energies falling outside a desired range (e.g., too low or too high pulse amplitudes or energies) will be located around the two edges along the long axis of the spatially divergent reflected beam DRB and in some cases might be even spatially separated from the spatially divergent reflected beam. By using the spatial filter SF to spatially filter out the undesired part of the spatially divergent reflected beam DRB, the remaining part of the reflected beam DRB will comprise pulses with much more consistent pulse amplitudes or energies, thereby resulting in low pulse-to-pulse variations or RIN.

According to the reference, H.-J. Butt et al., Surface Science Reports 59 (2005) 1-152 (hereby incorporated by reference), the exerted force due to an incident beam of radiation is given by:

$$F_{photon} = \frac{2P_R + P_A}{c_0}\cos\theta, \qquad [2]$$

where $P_R$ is the reflected power, $P_A$ is the absorbed power, $\theta$ is the incident angle and $c_0$ is the speed of light. Assuming the deflectable mirror DM is coated with a reflection coating, then $P_A=0$. The (instantaneous) power due to reflection is related to the pulse energy $\varepsilon$ and pulse width $\tau$ by:

$$P = \frac{\varepsilon}{\tau}. \qquad [3]$$

In a static analysis, the deflection of the deflectable mirror DM for a given force is given by:

$$Z = \frac{F}{k}, \qquad [4]$$

where k is the spring constant, Z is the deflection. The spring constant k of the deflectable mirror DM is given by:

$$k = \frac{Ewt^3}{4L^3}. \qquad [5]$$

22 where E is Young's modulus, w, t and L are the deflectable mirror's width, thickness and length, respectively.

However, here each pulse is treated independently, and this requires a dynamic treatment. The deflectable mirror acts as a mass-spring system, therefore follows simple harmonic motion. Therefore, each deflectable mirror will follow a $2^{nd}$ order equation of motion. In accordance with the reference, Fundamentals of Vibrations, Leonard Meirovitch, McGraw-Hill, 2001, the $2^{nd}$ order equation of motion is given by:

$$m\frac{d^2z(t)}{dt^2} + c\frac{dz(t)}{dt} + kz(t) = 0, \qquad [6]$$

where m is the (effective) mass of the deflectable mirror DM and c is the coefficient of viscous damping. The regime operated in is such that it results in an underdamped second order system. The solution of this system is known. In particular, the response of an underdamped $2^{nd}$ order system subjected to initial conditions is:

$$z(t) = Ce^{-\zeta\omega_n t}\cos\omega_d t - \phi, \qquad [7]$$

$$C = \sqrt{z_0^2 + \left(\frac{\zeta\omega_n z_0 + v_0}{\omega_d}\right)^2} \quad \phi = \tan^{-1}\frac{\zeta\omega_n z + v_0}{\omega_d z_0}, \qquad [8]$$

$$\omega_n = \sqrt{\frac{k}{m}}; \qquad [9]$$

$$\omega_d = \omega_n\sqrt{1 - \zeta^2}; \qquad [10]$$

$$\zeta = \frac{c}{2m\omega_n}. \qquad [11]$$

Note that the equation of motion, i.e. equation [6], and its solution, i.e. equation [7], as provided above assumes a zero-force applied. In our case, the force is not zero, instead there is an 'impact' caused by each incident pulse. It is known that impulsive forces produce initial velocities given by:

$$v_0 = \frac{I}{m}, \qquad [12]$$

where, for an impulse with unit area under the force-time curve, I=1 kilogram-meter per second (kg·m/s). However, since the pulse used is a Gaussian pulse with a finite pulse width as characterized by e.g., the full width half maximum (FWHM), I is not 1 and should be derived. To do this, it may be assumed that the incoming pulse is rectangular. This is a good assumption given the Gaussian nature of the pulse. Also, the angle of incidence is assumed to be zero. Then:

$$F_{photon} = \frac{2\varepsilon}{c_0\tau}, \qquad [13]$$

$$I = \int F_{photon}dt \approx F_{photon}\tau, \qquad [14]$$

$$v_0 = \frac{F_{photon}\tau}{m} = \frac{2\varepsilon}{mc_0}. \qquad [15]$$

Therefore, the response of the deflectable mirror DM to pulses of energy ε is now completely determined. Note that the pulse width does not actually affect the response of the deflectable mirror DM (within the approximation used above).

The above equations, i.e., equations [4] to [15], together with the relevant parameters can be used to simulate a deflectable mirror based mass-spring system. To facilitate the simulation, parameters of an example cantilever of a commercial atomic force microscope (AFM) may be used. AFM cantilevers have many advantages for being used as deflectable mirrors. First, AFM cantilevers are a known technology and are commercially available. Secondly, there are many different cantilevers with various different parameters (e.g., varying stiffness) already available on the market, thereby allowing different use cases. Thirdly, most if not all commercial AFM cantilevers are already coated with one or more optical coatings to reflect laser light in AFM, therefore, it may be possible to use them directly. If existing coatings of an AFM cantilever are not suitable for the incident broadband output radiation ORD, different reflection coatings may be applied to the cantilever, the reflection coatings being optimized in accordance with the spectral profile of the incident broadband output radiation ORD.

Figure 13:
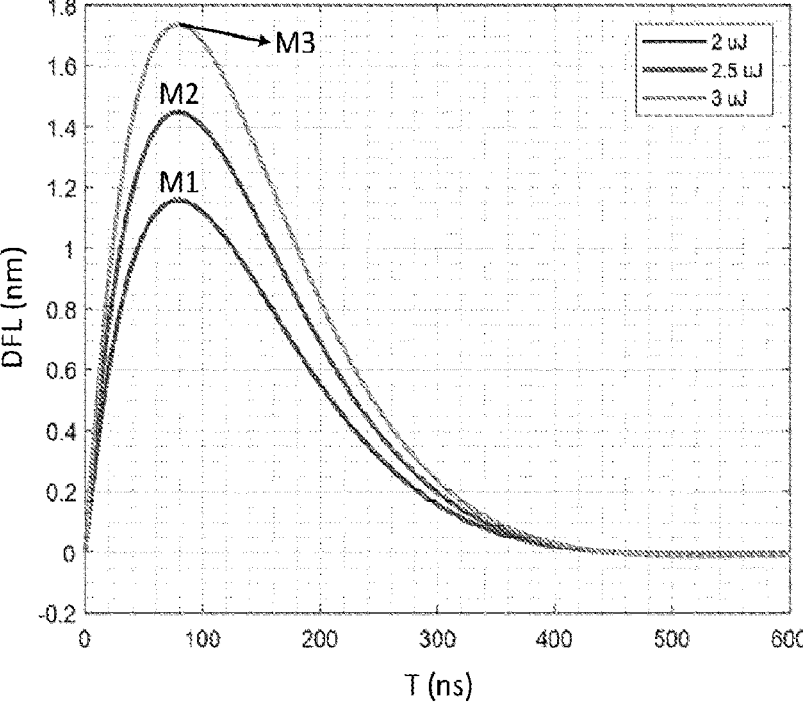
FIG. 13 is a plot showing the simulated time-dependent deflection of a deflectable mirror (e.g., a cantilever) induced by a single reflection of three optical pulses each with a different pulse energy.

By applying the following parameters to above equations, the response of a deflectable mirror (e.g., an AFM cantilever) to incident pulses of a given energy can be determined. Note that, the parameter values shown below are based on an example implementation; other different parameter values based on different implementations are equally applicable.

dt=1e-9; % Time step
t=(0: dt:0.6e-6); % Time
c=80e-7; % Coefficient of Viscous Damping
w=20e-6; % Width of Cantilever
L=25e-6; % Length of Cantilever
thick=1.25e-6; % Thickness of Cantilever
E=100e9; % Young's Modulus of Silicon
rho=2329; % Density of Silicon
m=0.2427*w*thick*L*rho; % Effective mass of Cantilever
z0=0e-6; % Initial Displacement
e=0.5*5e-6; % Incident Pulse Energy FIG. 13 is a plot showing the simulated time-dependent deflection of a cantilever induced by a single reflection of three optical pulses each with a different pulse energy. In the simulation, the material of the cantilever is silicon and the width, length and thickness of the cantilever are 20 μm, 25 μm and 1.25 μm, respectively. The angle of incidence of all the pulses is set to or substantially close to 0 degree. The deflection of the deflectable mirror is in the unit of nanometer and is a result of radial movement of the free end of the deflectable mirror DM with respect to the fixed end after it being struck by each optical pulse. As shown in FIG. 13, the maximum deflection increases with the pulse energy and for all three deflection curves, the maximum deflection point M1, M2, M3 is located at about 80 ns after the cantilever being struck with pulses of the broadband output radiation ORD. How fast the response gets damped has a dependence on the geometry of the cantilever. In this particular simulation shown in FIG. 13, the cantilever needs at least 400 ns to damp a response induced by an incident pulse. In other words, the deflection of the cantilever returns to zero at about 400 ns after the cantilever being struck with pulses of the broadband output radiation ORD. A response time of 400 ns corresponds to a pulse repetition rate of 2.5 MHz. Therefore, the pulse repetition rate of the broadband output radiation may be maintained below 2.5 MHz in order to ensure that when the next pulse arrives at the cantilever, the deflection of the cantilever caused by the previous pulse has at least substantially returned to zero. This is not a limitation since as mentioned before higher repetition rates generally have lower laser noise and would not need this invention as much. Additionally, the 400 ns number can be changed by changing the environment around the cantilever so that the damping happens faster.

It should be appreciated that the pulses of the broadband output radiation ORD are subject to reflection prior to any noticeable deflection of the deflectable mirror. This is evident in the simulation data shown in FIG. 13 where the maximum deflection of the cantilever is recorded at a delay time of about 80 ns with respect to the point of time at which a pulse is reflected by the cantilever. Such a delayed response is mainly due to the fact that a deflectable mirror (e.g., a cantilever) based mass-spring system has a finite inert mass which exhibits acceleration times much longer than the duration of incident light pulses (e.g., pulses of output radiation generated from a HC-PCF based broadband radiation source). While having transferred momentum to the deflectable mirror, a single pulse would reflect from an essentially non-deflected mirror. Since a larger mirror deflection enables better spatial separation of pulses with different pulse energies which in turn allows for more effective removal of those pulses with unwanted amplitudes or energies, it is desirable to configure the optical filter arrangement OFA in such a way that the reflected pulse, which had already caused the deflectable mirror DM to deflect upon a first reflection, is directed back to the deflectable mirror DM for a second reflection when the deflection of the deflectable mirror reaches the maximum. The redirection of each optical pulse for the second reflection on the deflectable mirror DM may be achieved by means of an optical delay line, for example.

Figure 14:
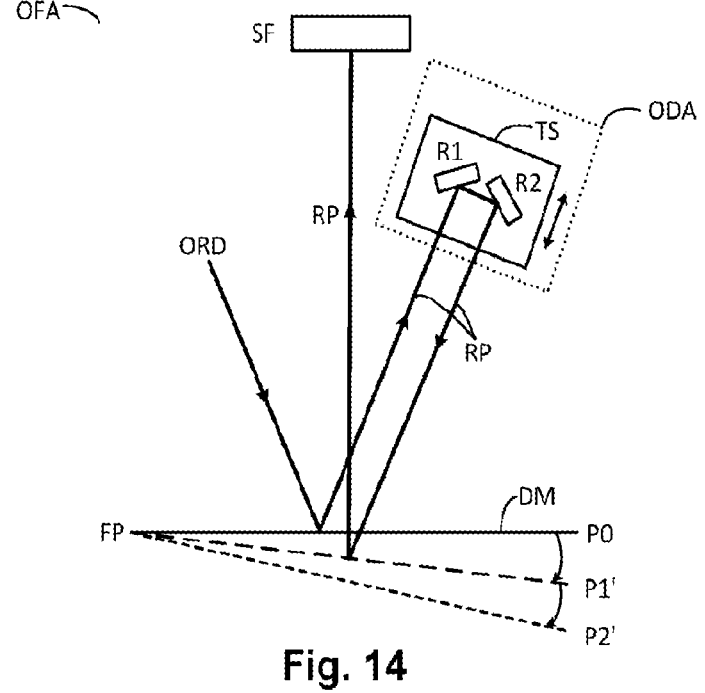
FIG. 14 schematically depicts an embodiment of the optical filter arrangement.

FIG. 14 schematically illustrates an embodiment of the optical filter arrangement OFA. In the embodiment, the optical filter arrangement OFA may comprise a deflectable mirror DM, an optical delay arrangement ODA, and a spatial filter. A beam of broadband output radiation ORD comprising a train of optical pulses may be obliquely incident on a deflectable mirror DM. The broadband output radiation ORD may be generated for example by a hollow core optical fiber based broadband radiation source. Hence, the values of relevant laser parameters may fall within the typical parameter ranges described in above paragraphs. Note that the proposed methods and apparatuses are not limited to reduce laser noise of broadband radiation; they are equally applicable for reducing laser noise of radiation with a narrow spectral bandwidth.

The deflectable minor DM may be any minor which is able to deflect or tilt about a fixing point FP of the deflectable mirror DM upon reflection of an incident laser pulse. The deflection or tilting of the deflectable minor DM may occur in the plane of reflection in which the broadband output radiation ORD gets reflected by the deflectable minor DM. In the embodiment of FIG. 14, the deflectable minor may comprise a cantilever, one end of which is fixed at the fixing point FP e.g., to a mirror support (not shown), and the other end can move or displace. The example cantilever may be made of silicon. The dimensions of the cantilever are the same as those used in the simulation shown in FIG. 13.

In different embodiments, other types of deflectable minors DM that are made of different materials other than silicon may be used. In addition, the dimensions of the deflectable minor DM may be flexible chosen so as to meet different application needs. In some embodiments, the deflectable minor may comprise one or both of width and length in the range between 1 μm and 1000 μm, 1 μm and 500 μm, 1 μm and 100 μm, or 1 μm and 10 μm; and may comprise a thickness in the range between 1 μm and 5 μm, 1 μm and 10 μm, or 1 μm and 100 μm. In some embodiments, the deflectable minor DM may comprise one or more reflection coatings which are configured to provide a high reflectivity in a desired spectral range, e.g., the spectral range of the incident optical pulses. The high reflectivity in the desired spectral range may be at least 80%, or at least 85%, at least 90%, at least 95%, or at least 99%. The spectral range that the reflection coatings cover may be between 100 nm and 4000 nm, 400 nm and 900 nm, 500 nm and 900 nm, or 200 nm and 2000 nm. In some embodiments, the deflectable minor DM may provide sufficient deflection after it being subjected to optical pulses with a pulse energy in the range between 0.1 μJ and 100 μJ.

Upon first reflection from the deflectable minor DM (e.g., a cantilever), the incident optical pulses may be reflected to the optical delay arrangement ODA. Note that for the sake of simplicity, the optical pulses of the broadband output radiation ORD are assumed to comprise the same pulse energy and thus upon each reflection from the deflectable mirror DM (either deflected or non-deflected), all the pulses follow the same trajectory. This is why the reflected optical pulses are represented by a single solid line in FIG. 14. In reality, however, the optical pulses would comprise different pulse energies and therefore exert different radiation forces to the deflectable mirror DM. Consequently, the optical pulses would follow different trajectories upon reflection from the deflected minor resulting in the formation of a spatially divergent beam, such as the spatially divergent reflected beam DRB shown in FIG. 12. Driven by the radiation force exerted by an incident optical pulse during the first reflection, the deflectable minor DM may gradually move away from a default position P0 towards a first new position P1' where the first reflection induced deflection reaches the maximum.

The optical delay arrangement ODA may be configured to apply a delay time to the reflected optical pulses RP and subsequently direct the reflected optical pulses RP back to the deflectable minor DM. Such a delay time applied to the reflected optical pulse RP by the optical delay arrangement ODA may be adjustable. In an embodiment, the optical delay arrange ODA may comprise two mirrors R1, R2 arranged on a translation stage TS. Moving the translation stage TS may allow the travel distance between the two mirrors R1, R2 of the optical delay arrange ODA and the deflectable mirror DM to be varied, thereby resulting in a change in the delay time applied to the optical pulses. To make the best use of the maximum deflection of the deflectable mirror DM, the optical delay time may be optimized such that the second reflection of the reflected optical pulse RP on the deflectable mirror DM occurs substantially contemporaneously with the maximum deflection of the deflectable mirror DM, e.g., the first new position P1'. Substantially contemporaneously with the maximum deflection may be defined as arriving at the deflectable mirror when deflectable mirror is within 1%, 3%, 5%, 10%, 15% or 20% of its maximum deflection for example.

As described above, the maximum deflection may be dependent on the strength of the radiation force exerted by the incident optical pulse which in turn is dependent on the pulse energy of the incident optical pulse. Note that, while max deflection depends on incident pulse energy, the point in time when this occur is independent of pulse energy and is a property of the deflectable mirror (e.g., geometry, material) and environment (e.g., damping coefficient). In some embodiments, the delay time applied to the reflected pulses RP by the optical delay arrangement ODA may be in the range between 1 ns and 100 ns, 1 ns and 200 ns, 1 ns and 500 ns, or 1 ns and 1000 ns.

Upon second reflection from the deflectable mirror DM, the reflected optical pulse RP may follow a new propagation direction determined by the pulse energy dependent deflection of the deflectable mirror DM. For example, in the embodiment of FIG. 14, the second reflection of the reflected optical pulse RP may occur when the deflectable mirror DM has moved to the first new position P1'. The second reflection of the reflected optical pulse RP may induce a further mirror deflection in addition to the existing deflection that has been induced by the first reflection of the same pulse. Driven by the radiation force exerted by the reflected optical pulse RP during the second reflection, the deflectable mirror DM may continue to deflect and move from the first new position P1' to a second new position P2' where the second reflection induced deflection reaches the maximum. The total accumulated deflection of the deflectable mirror DM, i.e. from P0 to P2', may thus be the sum of the maximum deflection induced by the first reflection and the maximum deflection induced by the second reflection.

Figure 15:
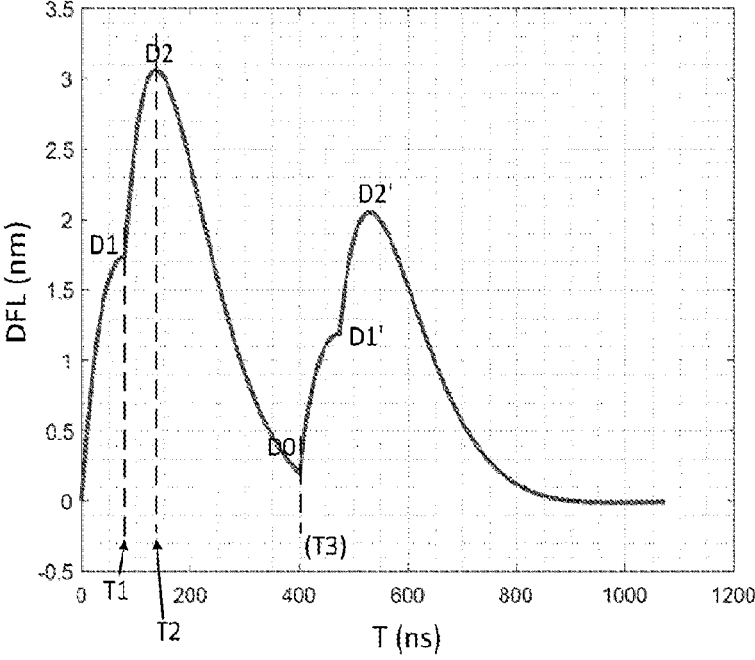
FIG. 15 is a plot showing the simulated time-dependent deflection of the deflectable mirror (e.g., cantilever), as used in the simulation shown in FIG. 13, induced by two reflections of two consecutively optical pulses.

FIG. 15 is a plot showing the simulated time-dependent deflection of the deflectable mirror (e.g., cantilever), as used in the simulation shown in FIG. 13, induced by two reflections of two consecutively incident optical pulses. The simulation shown in FIG. 15 is an extension of the simulation shown in FIG. 13. This means most parameter values (e.g., those associated with the deflectable mirror DM and the optical pulses) used in simulation shown in FIG. 13 are also used in the simulation shown in FIG. 15. The main difference between the two simulations is that the simulation shown in FIG. 15 is able to apply a delay time for the second reflection of the optical pulse and hence can demonstrate the additional mirror deflection induced by the second reflection of the same optical pulse.

As shown in FIG. 15, the first reflection of the first pulse causes the deflectable mirror DM to move from a default position with zero deflection (e.g., the default position P0 shown in FIG. 14) to a first new position where the mirror deflection reaches a first deflection point D1 at a first time instance T1 of 80 ns (e.g., the first new position P1' shown in FIG. 14). In this simulation, the first deflection point D1 is chosen to be the maximum deflection attainable with the radiation force exerted by the optical pulse during the first reflection. By applying a delay time of 80 ns (same as the simulation shown in FIG. 13) to the reflected optical pulse RP, the second reflection of the same pulse occurs at exactly or substantially the same time as when the deflection of the deflectable mirror DM reaches the first deflection point D1. Upon the second reflection, the deflectable mirror DM continues to deflect and moves from the first new position to a second new position (e.g., the second new position P2' shown in FIG. 14) where the deflection reaches a second deflection point D2 at a second time instance T2 of 130 ns. In this simulation, the second deflection point D2 is chosen to be the maximum deflection attainable with the radiation force exerted by the optical pulse during the second reflection. The second deflection point D2 is thus the maximum deflection point of the first peak of the deflection curve and has a value of 3.05 nm which is equivalent to the sum of the maximum deflection of 1.75 nm induced by the first reflection and the maximum deflection of 1.3 nm induced by the second reflection.

By the time the deflection of the deflectable mirror DM reaches the second deflection D2 at the second time instance of 130 ns, it starts to move back to the default position where the deflection is zero. To reduce or avoid the impact of any residual mirror deflection, it is desirable that the following optical pulse arrives at the deflectable mirror DM at a time when the deflection of the deflectable mirror DM is zero or substantially close to zero. In the simulation shown in FIG. 15, a second pulse strikes the deflectable mirror DM at a third time instance T3 of 400 ns where the mirror deflection has decreased to a residual deflection point D0 having a residual deflection of 0.2 nm. Since such a residual deflection is more than an order of magnitude lower than the maximum deflection at the second deflection point D2, i.e. 3.05 nm, its impact to a following optical pulse is hence negligible.

To ensure a pulse separation time of at least 400 ns, the repetition rate of the incident optical pulses may be maintained to be no higher than 2.5 MHz. Note that the aforementioned values are based on the example configuration of the optical filter arrangement OFA adopted in the simulation shown in FIG. 15; different values may be obtained if the optical filter arrangement OFA is configured in a different manner.

As shown in FIG. 15, the second peak of the deflection curve resulting from the two reflections of the second pulse is similar to the first peak resulting from the two reflections of the first pulse, in that the deflection of the deflectable mirror DM increases from the residual deflection point DO to a first deflection point D1' (after the delay time of 80 ns) before reaching a second deflection point D2'. Here, the second deflection point D2' is also the maximum deflection point of the second peak of the deflection curve. The deflection at the first deflection point D1' is the maximum deflection induced by the first reflection of the second pulse while the deflection at the second deflection point D2' is the sum of the maximum deflections induced respectively by the two reflections of the second pulse. Once the deflection of the deflectable mirror DM reaches the maximum, i.e. the second deflection point D2', it starts to decrease to zero again.

Referring back to FIG. 14, after the two reflections from the deflectable mirror DM, each reflected optical pulse may be directed towards a spatial filter SF by following a pulse energy dependent trajectory. The spatial filter SF may be used to at least partially block a part (e.g., in the periphery region) of the spatially divergent optical beam comprising optical pulses with undesired pulse energies, e.g., pulse energies outside a certain range. As such, the energy distribution of the optical pulses transmitting through the spatial filter SF becomes more homogeneous, or in other words, the pulse-to-pulse amplitude or energy variation is reduced. The pulse energy range may be within ±5%, ±10%, or ±15% of the mean energy of the optical pulses.

In some embodiments, the spatial filter SF may comprise an aperture which includes an absorptive, scattering and/or reflective substrate that includes a hole. In a preferred embodiment, the spatial filter SF may comprise a soft aperture, the substrate of which comprises a material (e.g., a suitable glass) having a gradually varying transmission to the optical pulses. In different embodiments, the spatial filter SF may be configured to be dynamically adjustable. For example, the position and/or the size of the aperture of the spatial filter SF may be dynamically adjustable such that the spatial filter SF is always in good alignment with the deflectable mirror DM and the extent of the laser noise reduction can be actively controlled through varying the aperture size of the spatial filter SF. In different embodiments, the spatial filter SF may operate in a reflective configuration. For example, the spatial filter may comprise a reflective mirror which selectively reflects a part (e.g., in the central region) of the spatially divergent optical beam while absorbing or transmitting the unselected part (e.g., in the periphery region) of the optical beam.

Note that, the above embodiments are provided herein for the purpose of description and hence are not limiting, other embodiments comprising a different deflectable mirror and/or a different spatial filter are also possible. For example, in some embodiments, the deflectable mirror DM may be operated in a different medium (e.g., water, gas, oil) other than the air and consequently the response of the deflectable minor DM to optical pulses may be different. This may be due to the fact that the deflectable minor DM operating in a different medium may have a different value of the coefficient of viscous damping, i.e., c in equation [11], than that in the air. In different embodiments, one or more optical lenses may be used to control (e.g., increase or decrease) the beam diameter of the incidence radiation, e.g., the broadband output radiation ORD, such that the requirements on the physical dimensions of the deflectable minor DM can be relaxed. Note also that, although the above embodiments are described in the context of reducing laser noise of pulsed broadband radiation, the optical filter arrangement OFA should be appreciated as a tool capable of improving noise performance of pulsed radiation with different temporal and spectral characteristics (e.g., pulse width, spectral bandwidth, and center wavelength).

Figure 16:
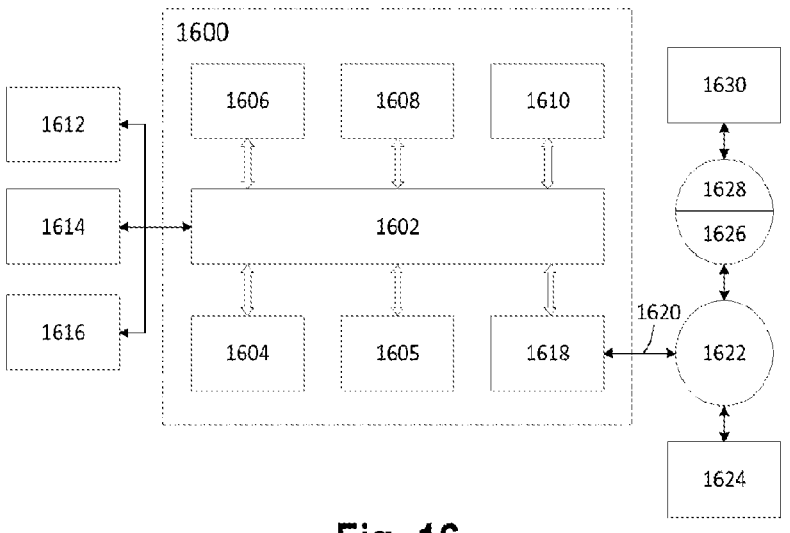
FIG. 16 depicts a block diagram of a computer system for controlling a broadband radiation source.

FIG. 16 is a block diagram that illustrates a computer system 1600 that may assist in implementing the methods and flows disclosed herein. Computer system 1600 includes a bus 1602 or other communication mechanism for communicating information, and a processor 1604 (or multiple processors 1604 and 1605) coupled with bus 1602 for processing information. Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT) or flat panel or touch panel display for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. A touch panel (screen) display may also be used as an input device.

One or more of the methods as described herein may be performed by computer system 1600 in response to processor 1604 executing one or more sequences of one or more instructions contained in main memory 1606. Such instructions may be read into main memory 1606 from another computer-readable medium, such as storage device 1610. Execution of the sequences of instructions contained in main memory 1606 causes processor 1604 to perform the process steps described herein. One or more processors in a multiprocessing arrangement may also be employed to execute the sequences of instructions contained in main memory 1606. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 1604 for execution. Such a medium may take many forms, including but not limited to, non-volatile media, volatile media, and transmission media. Non-volatile media include, for example, optical or magnetic disks, such as storage device 1610. Volatile media include dynamic memory, such as main memory 1606. Transmission media include coaxial cables, copper wire and fiber optics, including the wires that comprise bus 1602. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1604 for execution. For example, the instructions may initially be borne on a magnetic disk of a remote computer. The remote computer can load the instructions into its dynamic memory and send the instructions over a telephone line using a modem. A modem local to computer system 1600 can receive the data on the telephone line and use an infrared transmitter to convert the data to an infrared signal. An infrared detector coupled to bus 1602 can receive the data carried in the infrared signal and place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also preferably includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the worldwide packet data communication network, now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are exemplary forms of carrier waves transporting the information.

Computer system 1600 may send messages and receive data, including program code, through the network(s), network link 1620, and communication interface 1618. In the Internet example, a server 1630 might transmit a requested code for an application program through Internet 1628, ISP 1626, local network 1622 and communication interface 1618. One such downloaded application may provide for one or more of the techniques described herein, for example. The received code may be executed by processor 1604 as it is received, and/or stored in storage device 1610, or other non-volatile storage for later execution. In this manner, computer system 1600 may obtain application code in the form of a carrier wave.

Further embodiment are disclosed in the subsequent list of numbered clauses:

1. An optical filter apparatus, comprising:
an optical divergence device, operable to receive optical pulses and spatially distribute the optical pulses over an optical plane in dependence with a pulse energy of each of the optical pulses; and
a spatial filter, located at said optical plane, operable to apply spatial filtering to the optical pulses based on a location of each of the optical pulses at the optical plane resulting from the spatial distributing.

2. An optical filter apparatus as defined in clause 1, wherein the optical divergence device comprises a deflectable mirror configured to receive and subsequently reflect the optical pulses; said deflectable mirror being further configured to deflect upon every reflection of each of the optical pulses, the magnitude of said deflection being dependent on a pulse energy of each of the optical pulses and said deflection resulting in spatially distributing the optical pulses over the optical plane.

3. An optical filter apparatus as defined in clause 2, wherein the deflectable mirror comprises a cantilever having a fixed end which is fixed in position and a free end which is moveable in the plane of reflection.

4. An optical filter apparatus as defined in clause 3, wherein the deflection of the deflectable mirror comprises a radial movement of the free end with respect to the fixed end due to each impact by the optical pulses.

5. An optical filter apparatus as defined in any of clauses 2 to 4, wherein the deflectable mirror comprises silicon.

6. An optical filter apparatus as defined in any of clauses 2 to 5, wherein the deflectable mirror comprises a width in the range between 1 μm and 1000 μm.

7. An optical filter apparatus as defined in any of clauses 2 to 6, wherein the deflectable mirror comprises a length in the range between 1 μm and 1000 μm.

8. An optical filter apparatus as defined in any of clauses 2 to 7, wherein the deflectable mirror comprises a thickness in the range between 0.1 μm and 100 μm.

9. An optical filter apparatus as defined in any of clauses 2 to 8, wherein the deflectable mirror is configured such that upon the second reflection, each of the optical pulses is reflected into a propagation direction according to its pulse energy.

10. An optical filter apparatus as defined in any of clauses 2 to 9, wherein the deflectable mirror comprises at least one reflection coating configured for reflecting the optical pulses.

11. An optical filter apparatus as defined in clause 10, wherein the at least one reflection coating provides a reflectivity of at least 80% in a spectral range defined by the optical pulses.

12. An optical filter apparatus as defined in clause 11, wherein the spectral range covered the at least one reflection coating is between 100 nm and 4000 nm.

13. An optical filter apparatus as defined in any of clauses 2 to 12, wherein the deflectable mirror is configured to provide sufficient deflection to spatially distribute the optical pulses when the pulse energy of the optical pulses is in the range between 0.1 µJ and 100 µJ.

14. An optical filter apparatus as defined in any of clauses 2 to 13, wherein the optical divergence device further comprises an optical delay arrangement configured to apply a delay time to the optical pulses subsequent to them having undergone a first reflection from the deflectable mirror and direct them back to the deflectable mirror to undergo a second reflection by the deflectable mirror.

15. An optical filter apparatus as defined in clause 14, wherein the delay time applied by the optical delay arrangement is such that each of the optical pulses arrives at the deflectable mirror for the second reflection at a time when the deflection of the deflectable mirror is substantially at a maximum.

16. An optical filter apparatus as defined in clause 14 or 15, wherein said optical delay arrangement comprises a configurable delay time.

17. An optical filter apparatus as defined in any of clauses 14 to 16, wherein the optical delay arrangement is configured to comprise at least two optical mirrors placed on a translation stage, the translation stage being moveable to vary a distance between the optical delay arrangement and said deflectable mirror.

18. An optical filter apparatus as defined in any preceding clause, wherein the spatial filter comprises a first region which is configured to select a first portion of said optical pulses, the locations of which fall within the first region, and a second region configured to at least partially block a second portion of said optical pulses, the locations of which fall within the second region.

19. An optical filter apparatus as defined in clause 18, wherein the spatial filter comprises a substrate comprising an aperture.

20. An optical filter apparatus as defined in clause 18, wherein the spatial filter is reflective such that said first region comprises a reflective region and said second region an absorbing region.

21. An optical filter apparatus as defined in any of clauses 18 to 20, wherein the at least partially blocked optical pulses comprises optical pulses having a pulse energy deviated from the mean energy of the optical pulses by more than 5%.

22. An optical filter apparatus as defined in any of clauses 18 to 20, wherein the at least partially blocked optical pulses comprises optical pulses having a pulse energy deviated from the mean energy of the optical pulses by more than 10%.

23. An optical filter apparatus as defined in any of clauses 18 to 20, wherein the at least partially blocked optical pulses comprises optical pulses having a pulse energy deviated from the mean energy of the optical pulses by more than 15%.

24. An optical filter apparatus as defined in any of clauses 18 to 23, wherein the spatial filter is configured such that the size and/or position of the first region is adjustable.

25. An optical filter apparatus as defined in any preceding clause, wherein a distance between said spatial filter and the optical divergence device is adjustable.

26. An optical fiber apparatus as defined in any preceding clause, further comprising one or more optical lenses configured to control a beam diameter of the optical pulses prior to their reception by the optical divergence device.

27. A broadband light source device, being configured for generating broadband output radiation comprising said optical pulses upon receiving pump radiation, comprising an optical filter apparatus as defined in any preceding clause.

28. A broadband light source device, being configured for generating broadband output radiation comprising said optical pulses upon receiving pump radiation, comprising an optical filter apparatus as defined in any of clauses 2 to 17 and, configured such that a pulse separation time of the optical pulses is configured to be substantially equal to or longer than a period of time required for the deflection of the deflectable mirror to decrease to zero or substantially near zero.

29. A broadband light source device as defined in clause 27 or 28, wherein the broadband output radiation is generated in a hollow core photonic crystal fiber (HC-PCF).

30. A metrology device comprising a broadband light source device as defined in any of clauses 26 to 28.

31. A metrology device as defined in clause 30, comprising a scatterometer metrology apparatus, a level sensor or an alignment sensor.

32. A method of spatial filtering optical pulses, comprising: spatially distributing a plurality of optical pulses over an optical plane in dependence with a pulse energy of each of the optical pulses; and spatially filtering the optical pulses based on a location of each of the optical pulses at the optical plane resulting from the spatial distributing.

33. A method as defined in clause 32, wherein the spatial distributing of the optical pulses further comprises:

using a deflectable mirror to first reflect optical pulses;

applying a delay time to the optical pulses first reflected from the deflectable mirror and subsequently directing them back to the deflectable mirror;

using the deflectable mirror to second reflect the delayed optical pulses to spatially distribute the optical pulses;

wherein the deflectable mirror is deflected upon every reflection of each of the optical pulses, the deflection of the deflectable mirror being dependent on a pulse energy of each of the optical pulses.

34. A method as defined in clause 33, wherein the delay time applied is such that each of the optical pulses arrives at the deflectable mirror for the second reflection at a time when the deflection of the deflectable mirror is substantially at a maximum.

35. A method as defined in clause 33 or 34, wherein at least one pulse separation time of the optical pulses is substantially equal to or longer than a period of time required for the deflection of the deflectable mirror to return to zero or substantially near zero.

36. A method as defined in any of clauses 32 to 35, wherein the spatial filtering comprises at least partially blocking some of the optical pulses that are spatially distributed at the optical plane.

37. A method as defined in clause 36, wherein the at least partially blocked optical pulses comprises optical pulses having a pulse energy deviated from the mean energy of the optical pulses by more than 5%.

38. A method as defined in clause 37, wherein the at least partially locked optical pulses comprises optical pulses having a pulse energy deviated from the mean energy of the optical pulses by more than 10%.

39. A method as defined in clause 38, wherein the at least partially blocked optical pulses comprises optical pulses having a pulse energy deviated from the mean energy of the optical pulses by more than 15%.

40. A method as defined in any of clauses 32 to 39, further comprising controlling a beam diameter of the optical pulses prior to their spatial distribution over the optical plane.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. An optical filter apparatus, comprising:
an optical divergence device, configured to receive optical pulses and spatially distribute the optical pulses over an optical plane in dependence with a pulse energy of each of the optical pulses; and
a spatial filter, located at the optical plane, configured to apply spatial filtering to the optical pulses based on a location of each of the optical pulses at the optical plane resulting from the spatial distributing.

2. The optical filter apparatus as claimed in claim 1, wherein the optical divergence device comprises a deflectable mirror configured to receive and subsequently reflect the optical pulses, the deflectable mirror further configured to deflect upon every reflection of each of the optical pulses, the magnitude of the deflection being dependent on a pulse energy of each of the optical pulses and the deflection resulting in spatially distributing the optical pulses over the optical plane.

3. The optical filter apparatus as claimed in claim 2, wherein the deflectable mirror comprises a cantilever having a fixed end which is fixed in position and a free end which is moveable in the plane of reflection.

4. The optical filter apparatus as claimed in claim 3, wherein the deflection of the deflectable mirror comprises a radial movement of the free end with respect to the fixed end due to each impact by the optical pulses.

5. The optical filter apparatus as claimed in claim 2, wherein at least one selected from:
the deflectable mirror comprises a width in the range between 1 μm and 1000 μm,
the deflectable mirror comprises a length in the range between 1 μm and 1000 μm, and/or
the deflectable mirror comprises a thickness in the range between 0.1 μm and 100 μm.

6. The optical filter apparatus as claimed in claim 2, wherein the deflectable mirror is configured such that upon a second reflection, each of the optical pulses is reflected into a propagation direction according to its pulse energy.

7. The optical filter apparatus as claimed in claim 2, wherein the deflectable mirror comprises at least one reflection coating configured for reflecting the optical pulses.

8. The optical filter apparatus as claimed in claim 7, wherein the reflection coating provides a reflectivity of at least 80% in a spectral range defined by the optical pulses and the spectral range covered by the at least one reflection coating is between 100 nm and 4000 nm.

9. The optical filter apparatus as claimed in claim 2, wherein the deflectable mirror is configured to provide sufficient deflection to spatially distribute the optical pulses when the pulse energy of the optical pulses is in the range between 0.1 μJ and 100 μJ.

10. The optical filter apparatus as claimed in any of claim 2, wherein the optical divergence device further comprises an optical delay arrangement configured to apply a delay time to the optical pulses subsequent to them having undergone a first reflection from the deflectable mirror and direct them back to the deflectable mirror to undergo a second reflection by the deflectable mirror.

11. The optical filter apparatus as claimed in claim 10, wherein the optical delay arrangement comprises a configurable delay time.

12. A broadband radiation source device, configured for generating broadband output radiation comprising the optical pulses upon receiving pump radiation, the broadband radiation source comprising the optical filter apparatus as claimed in claim 2 and, configured such that a pulse separation time of the optical pulses is configured to be substantially equal to or longer than a period of time required for the deflection of the deflectable mirror to decrease to zero or substantially near zero.

13. A broadband radiation source device configured for generating broadband output radiation comprising the optical pulses upon receiving pump radiation, the broadband radiation source comprising the optical filter apparatus as claimed in claim 1.

14. A metrology device comprising the optical filter apparatus according to claim 1.

15. A method of spatial filtering optical pulses, the method comprising:
spatially distributing a plurality of optical pulses over an optical plane in dependence with a pulse energy of each of the optical pulses; and
spatially filtering the optical pulses based on a location of each of the optical pulses at the optical plane resulting from the spatial distributing.

16. The method as claimed in claim 15, wherein the spatial distributing of the optical pulses further comprises using a deflectable mirror to reflect optical pulses, wherein the deflectable mirror is deflected upon every reflection of each of the optical pulses, the deflection of the deflectable mirror being dependent on a pulse energy of each of the optical pulses.

17. The method as claimed in claim 16, wherein the spatial distributing of the optical pulses further comprises:

applying a delay time to the optical pulses first reflected from the deflectable mirror and subsequently directing them back to the deflectable mirror; and using the deflectable mirror to second reflect the delayed optical pulses to spatially distribute the optical pulses.

18. The method as claimed in claim 17, wherein the delay time applied is such that each of the optical pulses arrives at the deflectable mirror for the second reflection at a time when the deflection of the deflectable mirror is substantially at a maximum or wherein at least one pulse separation time of the optical pulses is substantially equal to or longer than a period of time required for the deflection of the deflectable mirror to return to zero or substantially near zero.

19. The method as claimed in claim 15, wherein the spatial filtering comprises at least partially blocking some of the optical pulses that are spatially distributed at the optical plane.

20. The method as claimed in claim 15, further comprising controlling a beam diameter of the optical pulses prior to their spatial distribution over the optical plane.

* * * * *